(12) United States Patent
Anderson

(10) Patent No.: US 8,567,545 B1
(45) Date of Patent: Oct. 29, 2013

(54) GAUGE MOUNT BRACKET WITH AIR VENTS

(76) Inventor: Eric Anderson, Enumclaw, WA (US)

(*) Notice: Subject to any disclaimer, the term of this patent is extended or adjusted under 35 U.S.C. 154(b) by 330 days.

(21) Appl. No.: 12/857,153

(22) Filed: Aug. 16, 2010

Related U.S. Application Data

(60) Provisional application No. 61/234,121, filed on Aug. 14, 2009.

(51) Int. Cl.
B62K 21/02 (2006.01)

(52) U.S. Cl.
USPC ........................................ 180/182; 280/288.4

(58) Field of Classification Search
USPC .............. 280/288.4, 276, 279, 275, 280, 277, 280/283; 248/231.61, 70, 73, 74.4, 481, 248/231.85, 288.31, 288.51, 315, 316.1, 248/316.6, 689, 224.51, 224.61, 309.1, 248/223.21, 311.2, 201, 222.12, 904, 27.1; 224/413, 424, 447, 450
See application file for complete search history.

(56) References Cited

U.S. PATENT DOCUMENTS 5,855,388 A * 1/1999 Brewer ...................... 280/288.4

* cited by examiner

Primary Examiner — Tony H. Winner
Assistant Examiner — Jacob Knutson
(74) Attorney, Agent, or Firm — Dean A. Craine

(57) ABSTRACT

A gauge mounting bracket for a snowmobile that allows hot gas in the engine compartment to circulate and escape through a plurality of side vent openings formed thereon. The mounting bracket allows the user to adjust the angular position of a speedometer or tachometer gauge on the dashboard of a snowmobile to accommodate riders who sit or stand while driving. The mounting bracket includes lower dashboard mounting surface and an upper gauge mounting surface. The lower dashboard mounting surface is flush mounted on the existing dashboard of a snowmobile while the upper gauge mounting surface is tilted upward and aligned 5 to 50 degrees from the dashboard mounting surface. During assembly, the mounting bracket is mounted over an existing or newly created hole in the dashboard that leads to the engine compartment. Heated air created in the compartment travels upward and rearward and then escapes through the vent openings.

8 Claims, 6 Drawing Sheets

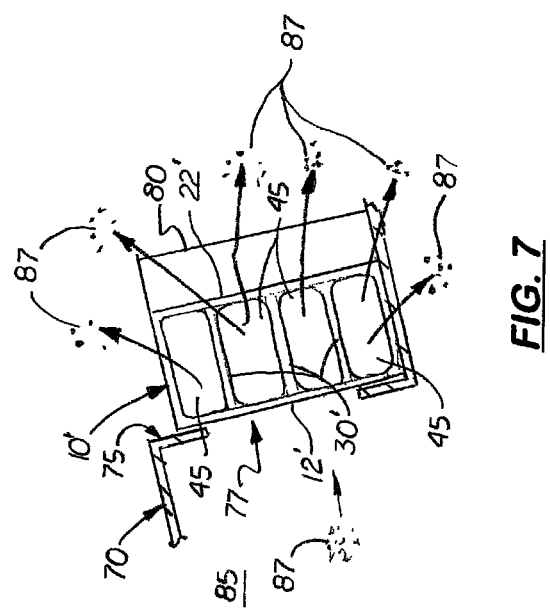

GAUGE MOUNT BRACKET WITH AIR VENTS

This is a utility patent application which claims benefit of U.S. provisional application No. 61/234,121, filed on Aug. 14, 2009.

BACKGROUND OF THE INVENTION

1. Field of the Invention

This invention pertains to an all terrain vehicle dashboard gauge and air vent system, and more particularly to dashboard gauge and air vent systems specifically designed for a snowmobile that enables a speedometer or tachometer gauge to be repositioned for viewing while riding a snowmobile in a sitting or standing position and also provides additional ventilation for cooling the engine.

2. Description of the Related Art

Snowmobile engines are air-cooled and require air ventilation during operation. Unfortunately, the engines are enclosed in a protective cowling that restricts air ventilation.

Snowmobile riders either sit or stand up on their snowmobiles. When riding in either position, the snowmobile rider must view the speedometer or tachometer gauges mounted on the dashboard. Unfortunately when standing, the dashboard is located below the rider's field of view which forces the driver to turn his or her head and look downward and take his or her eyes off the trail. When riding over rough terrain or at high speeds, taking his or her eyes off the trail, for a few seconds can be dangerous.

SUMMARY OF THE INVENTION

It is an object of the present invention to provide a bracket that can be attached to the existing dashboard on a snowmobile that enables the driver to re-position the gauges on the dashboard for easier viewing when sitting or standing.

It is another object of the invention to provide such a bracket that does not require structural modification of the snowmobile.

These and other objects are met by a snowmobile gauge mounting bracket with one or more air vents that allow hot gases from the engine to escape and flow through a hole formed in the dashboard for the speedometer or tachometer gauge. The bracket includes a lower dashboard mounting surface that attaches to the dashboard surface surrounding the existing hole in which a standard speedometer or tachometer gauge is normally placed. The bracket includes an upper gauge mounting surface on which a speedometer or tachometer gauge may be attached. In one embodiment, one or more top and side vent openings are formed in the bracket. In one embodiment, the upper gauge mounting surface and the lower mounting surface are aligned at an offset manner 5 to 50 degrees apart. In a second embodiment, the upper gauge mounting surface and the lower mounting surface are parallel.

During installation, the mounting bracket is coaxially aligned over the hole formed in the dashboard. The lower dashboard mounting surface is flush mounted on the outside surface of the dashboard. The bracket may be rotated over the outside surface of the dashboard so that the upper gauge mounting surface is selectively aligned for maximum viewing by a driver in a standing or a sitting position. Suitable connectors are then used to securely attach the bracket to the dashboard. A speedometer or tachometer gauge is then attached to the upper gauge mounting surface.

During use, hot air in the engine cowling flows upward and escapes through the top or side vent openings in the bracket and help cool the engine and to provide warm air to the driver.

BRIEF DESCRIPTION OF THE DRAWINGS

FIG. 7 is a partial, sectional side elevational view of a dashboard similar to the view shown in FIG. 3 showing a second embodiment of the gauge mounting bracket with parallel dashboard mounting and gauge mounting surfaces.

DESCRIPTION OF THE PREFERRED EMBODIMENT(S)

Figure 1:
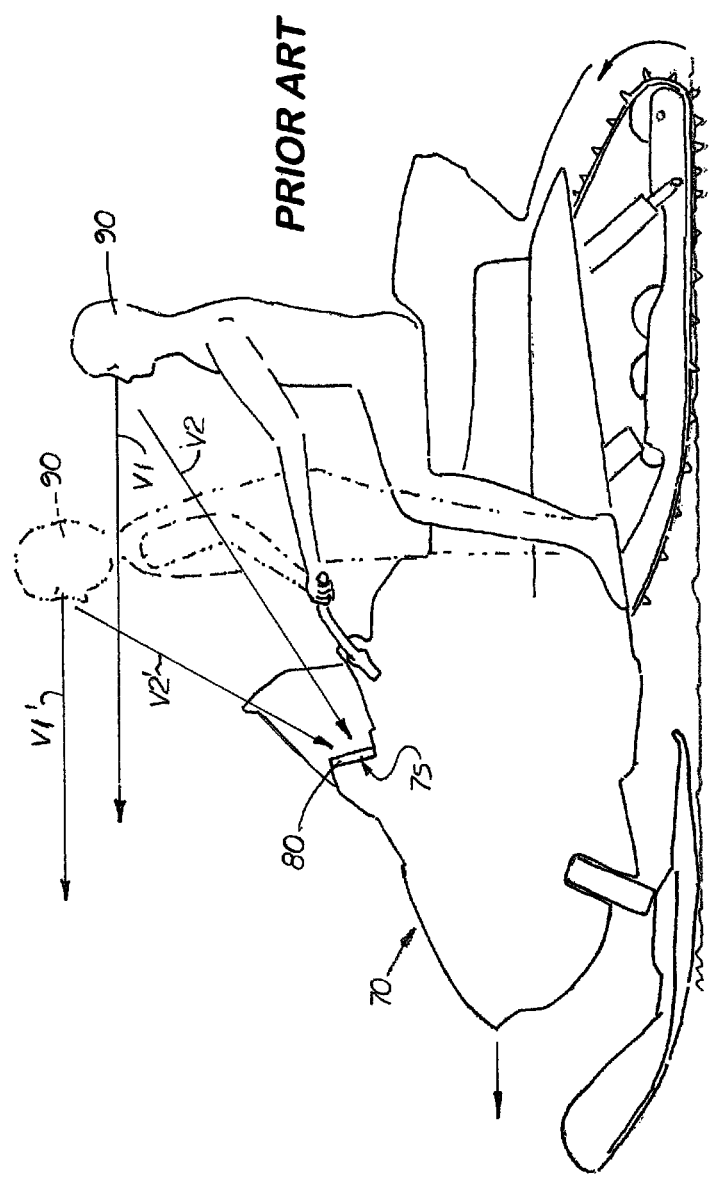
FIG. 1 is a side elevational view of a snowmobile in the prior art showing the dashboard with a typical speedometer or tachometer gauge mounted thereon and showing the forward terrain viewing angles and the gauge viewing angles of a sitting snowmobiler and a standing snowmobiler.

FIG. 1 is a side elevational view of a typical snowmobile 70 found in the prior art with an engine 72, an engine compartment 73, a dashboard 75, and a speedometer or tachometer gauge 80 attached to the dashboard 75. The dashboard 75 is slightly angled with a speedometer or tachometer gauge 80 flush mounted on the dashboard 75 and showing the approximate angles for viewing the gauge 80 by drivers 90, 90' in a sitting or standing position, respectively. Depicted in the FIG. 1, are the forward terrain viewing angles V1 and V1', and the gauge viewing angles V2 and V2' of the two drivers 90, 90'.

Figure 2:
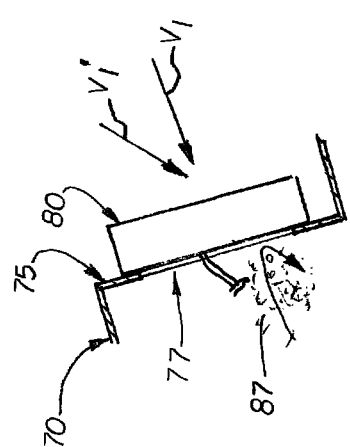
FIG. 2 is a partial, sectional side elevational view of the dashboard with a typical speedometer or tachometer gauge found in the prior art mounted thereon.

FIG. 2 is a partial side elevational view of the dashboard 75 on a snowmobile found in the prior art with the speedometer and tachometer gauge 80 mounted on the dashboard 75 and the buildup of hot air 87 inside the engine compartment 73 under the dashboard 75.

Figure 3:
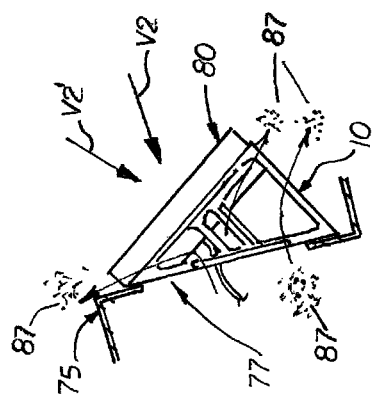
FIG. 3 is a partial, sectional side elevational view of the dashboard with the gauge mount bracket attached to the dashboard and the speedometer or tachometer gauge repositioned on the gauge mounting bracket.

FIG. 3 is a partial, sectional side elevational view of the dashboard 75 with the gauge mounting bracket 10 attached to the dashboard 75 and the speedometer or tachometer gauge 80 repositioned on the upper gauge mounting surface on the gauge mounting bracket 10 and showing the hot gas 87 escaping from the engine compartment 85 through side vent openings 47 and top vent openings 45.

Figure 4:
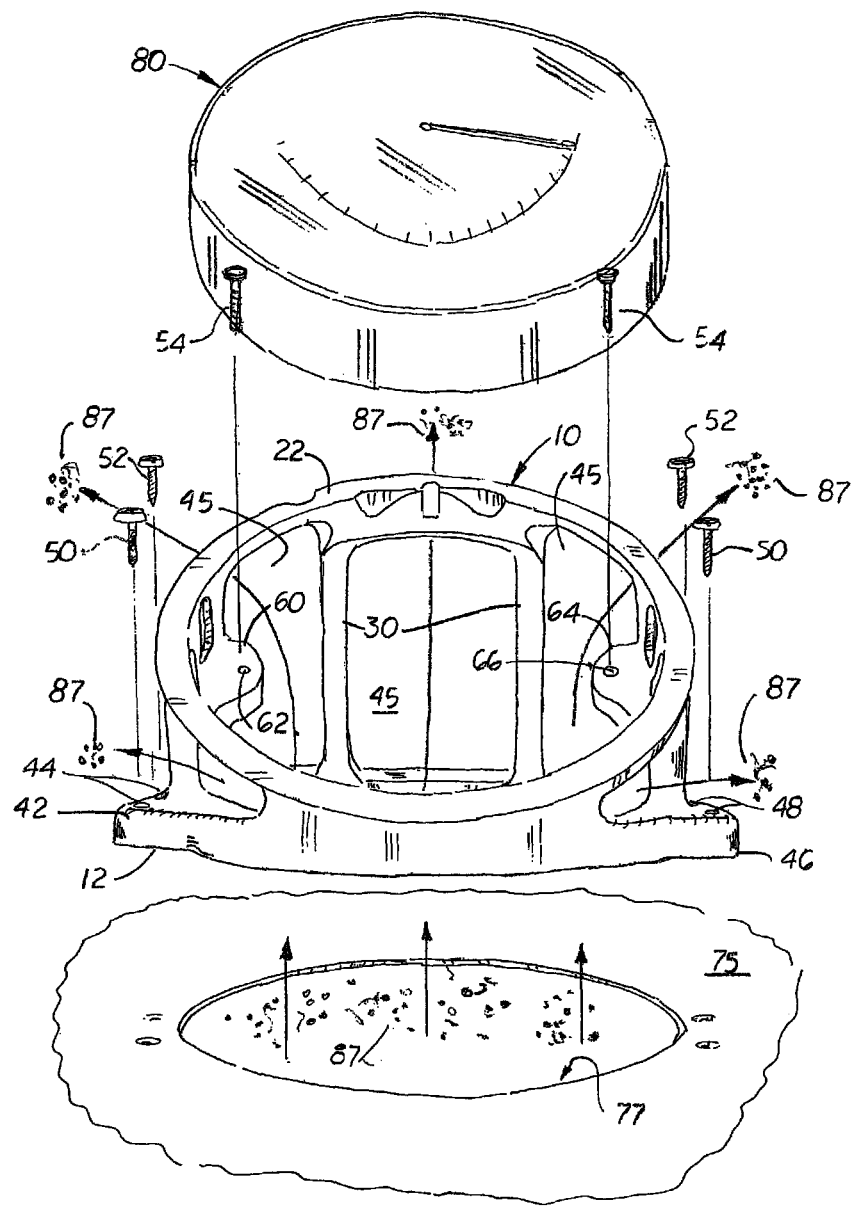
FIG. 4 is a top plan view of the dashboard showing the gauge mounting bracket being attached over a hole formed on the dashboard and showing a speedometer or a tachometer gauge being mounted on the upper gauge mounting surface on the mounting bracket.
Figure 5:
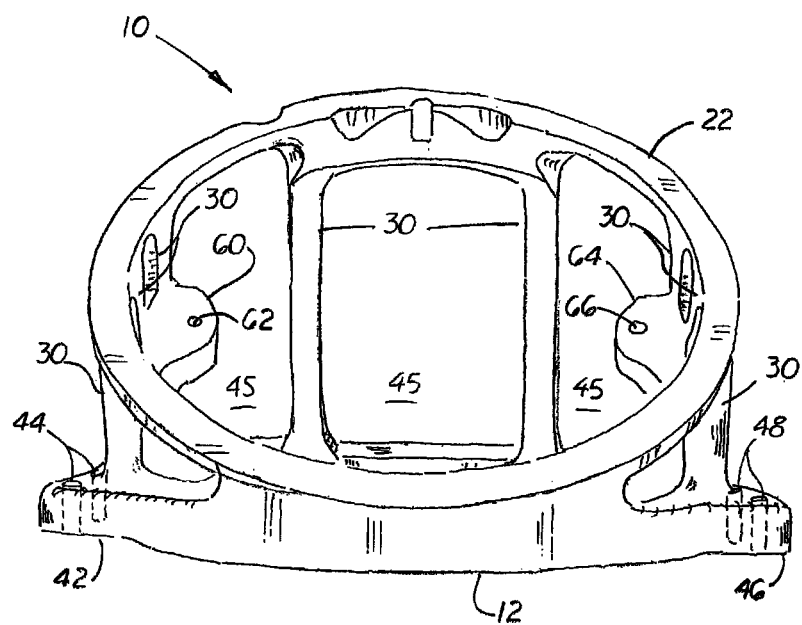
FIG. 5 is top elevational view of the gauge mounting bracket.
Figure 6:
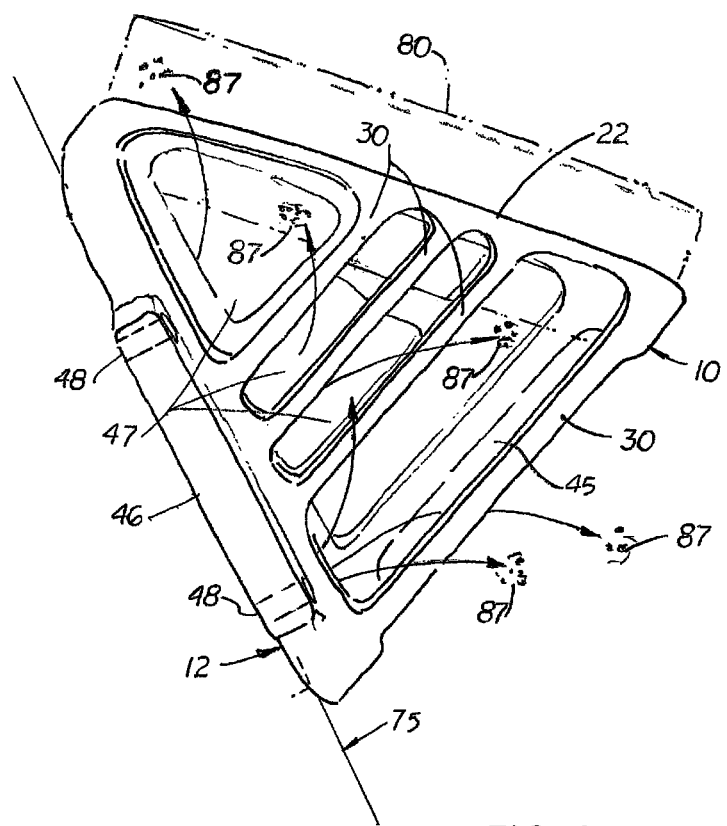
FIG. 6 is a side elevational view of the gauge mounting bracket.

As shown in FIGS. 4-6, the first embodiment of the gauge mounting bracket 10 is shown that includes a lower dashboard mounting surface 12 that attaches to the dashboard 75 surrounding a gauge pre-existing hole 77. In the first embodiment, the lower dashboard mounting surface 12 and the upper gauge mounting surface 22 are angled approximately 5 to 50 degrees apart. FIG. 7 shows a second embodiment of the bracket 10', in which the lower dashboard mounting surface 12' and the upper gauge mounting surface 22' are substantially parallel. The bracket 10' is used typically with snowmobiles in which the angle of the speedometer or tachometer gauge 80 on the dashboard 75 does not need to be altered.

Disposed between the lower dashboard mounting surface 12, 12' and the upper gauge mounting surface 22, 22' are a plurality of perpendicularly aligned support ribs 30, 30', respectively. The support ribs 30, 30' are spaced apart thereby creating a plurality of side vent openings 47 so that heated air 87 that flows upward from the engine compartment 73 located below the dashboard 75 may escape. In the first embodiment, there are two rear facing support ribs 30 and two sets of three ribs 30 formed on the lateral edges of the mounting bracket 10. Three elongated large top vent openings 45 are formed on the top surface of the bracket 10 and three smaller side vent openings 47 are formed on the two sides of the bracket 10, (see FIG. 7). The front edge of the lower dashboard mounting surface 12 is integrally formed with the front edge of the upper gauge mounting surface 22.

As shown in FIGS. 6 and 7, formed on the outer edges of the lower mounting surface 12 are two flanges 42, 46 with two non-threaded holes 44, 48, respectively, formed therein. During assembly, two threaded screws 50, 52 extend through complimentary size holes (not shown) formed in the dashboard 75 to securely attach the mounting bracket 10 to the dashboard 75. As shown on FIG. 5, formed on the inside of the two sets of triple ribs 30 are two inward extending ears 60, 64. Each ear 60, 64 includes a threaded bore 62, 66, respectively, designed to receive a screw 54 connected to the gauge 80 which holds the gauge 80 in a fixed position on the mounting bracket 10.

The diameter of the bracket 10 and the gauge 80 may be identical or variable. If the diameter of the gauge 80 is less than the diameter of the bracket 10, hot air may escape through the top vent openings 45. Optional side panels may be placed around the side vent to control the amount of air flowing therethrough.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A gauge mount and vent system for a snowmobile with an engine cowling that forms an engine compartment for an engine with a dashboard formed on the engine cowling, the system, comprising:
   a gauge hole formed on said dashboard that enables heated air produced by said engine to escape from said engine compartment;
   b. a gauge mounting bracket mounted on said dashboard and over said gauge hole, said gauge mounting bracket extends upward and rearward and includes a lower dashboard mounting surface and an upper gauge mounting surface, said lower dashboard mounting surface being configured for mounting on said dashboard and over said gauge hole, said lower dashboard mounting surface and said upper gauge mounting surface being spaced apart with air vent openings located between them so that heated air produced by the engine that passes through said gauge hole and flow into said mounting bracket and then escapes through said air vent openings;
   c. at least one connector for attaching said lower dashboard mounting surface on said gauge mounting bracket to said dashboard and over said gauge hole formed on said dashboard; and,
   d. a speedometer or tachometer engine gauge connected to upper gauge mounting surface.

2. The snowmobile dashboard mount and system, as recited in claim 1, wherein said lower dashboard mounting surface and said upper gauge mounting surface are aligned in an offset manner 5 to 50 degrees apart from each other.

3. The snowmobile dashboard mount and system as recited in claim 1, wherein said lower dashboard mounting surface and said upper gauge mounting surface are parallel.

4. A snowmobile dashboard gauge mount bracket for mounting a dashboard gauge for improved visibility when riding a snowmobile in a sitting or standing position and to allow heated air from the engine compartment formed by an engine cowling over the snowmobile's engine to escape through a hole formed on the dashboard and warm the rider, said mount bracket, comprising:
   a. lower dashboard mounting surface configured for positioning over said dashboard and over said hole;
   b. an upper gauge mounting surface; and,
   c a plurality of vent openings formed on said bracket, said vent openings configured so that when said lower dashboard mounting surface is positioned over said dashboard over said hole and said gauge is attached to said upper gauge mounting surface, heated air escapes from said engine compartment and flows into said bracket and through said vent openings.

5. The snowmobile dashboard mount bracket, as recited in claim 4, wherein said lower dashboard mounting surface and said upper gauge mounting surface are parallel.

6. The snowmobile dashboard mount bracket, as recited in claim 4, wherein said wherein said lower dashboard mounting surface and said upper gauge mounting surface are aligned in an offset manner 5 to 50 degrees apart from each other.

7. The snowmobile dashboard mount and system, as recited in claim 1, wherein said bracket includes a plurality of ribs that extend between said lower dashboard mounting surface and said upper gauge mounting surface, said ribs being spaced apart to form said vent openings.

8. The snowmobile dashboard mount bracket, as recited in claim 4, wherein said bracket includes a plurality of ribs that extend between said lower dashboard mounting surface and said upper gauge mounting surface, said ribs being spaced apart to form said vent openings.

* * * * *